(12) United States Patent
Magill et al.

(10) Patent No.: US 7,660,674 B2
(45) Date of Patent: Feb. 9, 2010

(54) METHOD FOR DETERMINING SEISMIC DATA QUALITY

(75) Inventors: James R. Magill, Walnut Creek, CA (US); John K. Washbourne, Walnut Creek, CA (US)

(73) Assignee: Chevron U.S.A., San Ramon, CA (US)

( * ) Notice: Subject to any disclaimer, the term of this patent is extended or adjusted under 35 U.S.C. 154(b) by 49 days.

(21) Appl. No.: 11/833,094

(22) Filed: Aug. 2, 2007

(65) Prior Publication Data

US 2009/0037115 A1 Feb. 5, 2009

(51) Int. Cl.
*G06F 15/00* (2006.01)
(52) U.S. Cl. ...................................................... 702/14
(58) Field of Classification Search ................... 702/14, 702/182–185; 703/1
See application file for complete search history.

(56) References Cited

U.S. PATENT DOCUMENTS 6,697,737 B2    2/2004   Jones et al.
2008/0175478 A1*  7/2008  Wentland et al. ............ 382/181

\* cited by examiner

*Primary Examiner*—Edward Raymond
(74) *Attorney, Agent, or Firm*—Torrey Pennebaker; Maurice Teixeira

(57) ABSTRACT

The present invention determines seismic data quality for a plurality of locations within a seismic survey for a geologic or geophysical region of interest. The present invention additionally includes generating correlation coefficients which relate to the seismic data quality so that the seismic data quality can be incorporated into geostatistical analyses associated with decisions that are based in part on the seismic survey.

6 Claims, 12 Drawing Sheets

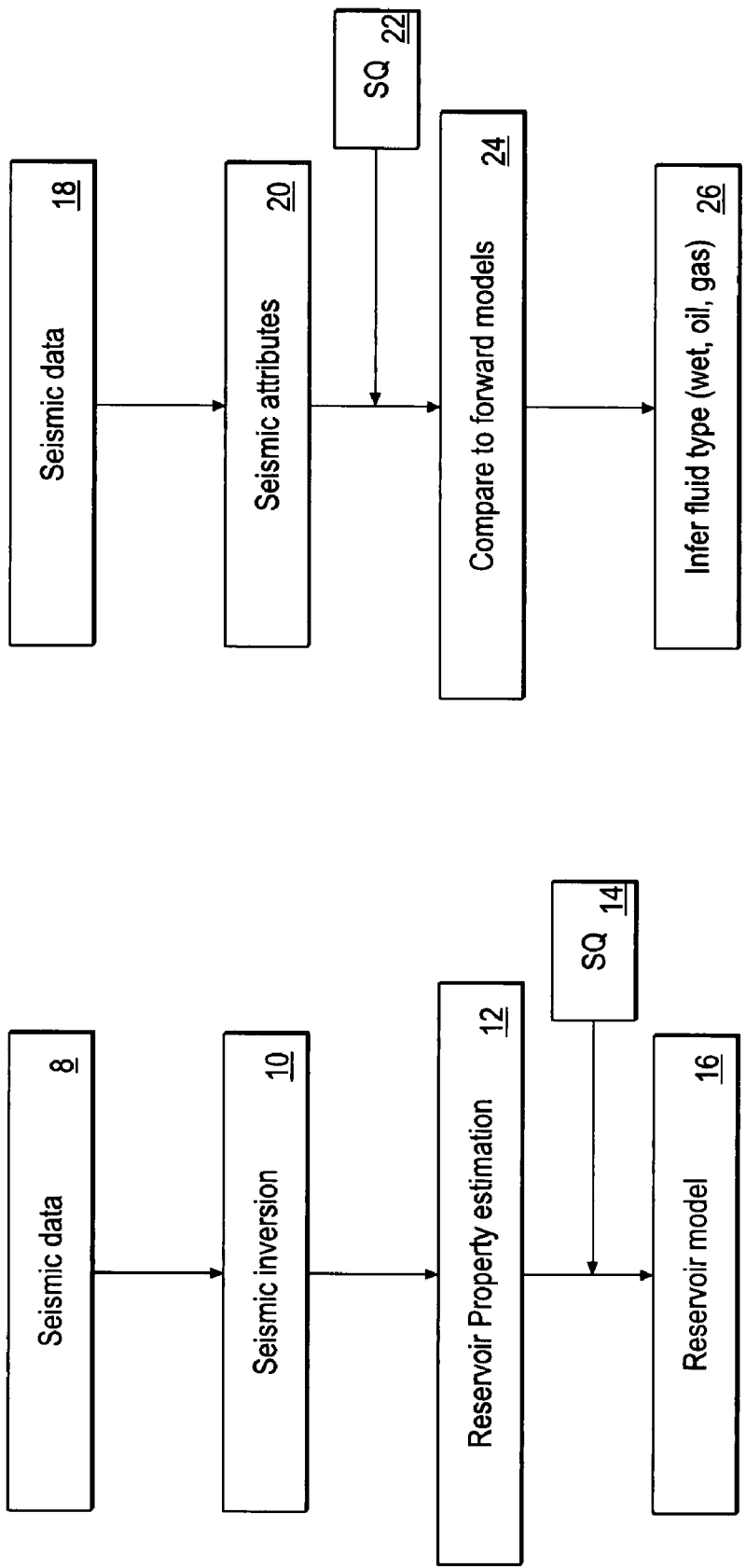

METHOD FOR DETERMINING SEISMIC DATA QUALITY

BACKGROUND OF THE INVENTION

This invention relates to seismic exploration and processing, and more specifically to determining the seismic data quality for a plurality of locations in a given seismic survey.

In the petroleum industry, seismic prospecting techniques are commonly used to aid in the search for and the evaluation of subterranean hydrocarbon deposits. In seismic prospecting, one or more sources of seismic energy emit waves into a subsurface region of interest, such as a geologic formation. These waves enter the formation and may be scattered, e.g., by reflection or refraction, by subsurface seismic reflectors (i.e., interfaces between underground formations having different elastic properties). The reflected signals are sampled or measured by one or more receivers, and the resultant data is recorded. The recorded samples may be referred to as seismic data or a "seismic trace". The seismic data may be analyzed to extract details of the structure and properties of the subsurface region of the earth being explored.

Seismic prospecting consists of three separate stages: data acquisition, data processing and data interpretation. The success of a seismic prospecting operation depends on satisfactory completion of all three stages.

In general, the purpose of seismic exploration is to map or image a portion of the subsurface of the earth (a formation) by transmitting energy down into the ground and recording the "reflections" or "echoes" that return from the rock layers below. The energy transmitted into the formation is typically sound energy. The downward-propagating sound energy may originate from various sources, such as explosions or seismic vibrations on land, or air guns in marine environments. Seismic exploration typically uses one or more energy sources and typically a large number of sensors or detectors. The sensors that may be used to detect the returning seismic energy are usually geophones (land surveys) or hydrophones (marine surveys).

One example of a seismic survey that is used in the art is three-dimensional ("3D") seismic exploration. In 3D seismic exploration survey lines and seismic arrays are closely spaced to provide detailed subsurface coverage. With this high density coverage, extremely large volumes of digital data need to be recorded, stored and processed before final interpretations can be made. Processing requires extensive computer resources and complex software to enhance the signal received from the subsurface and to mute accompanying noise which masks the signal.

After the data is processed, scientists and engineers assemble and interpret the 3D seismic information in the form of a 3D data cube which represents a display of subsurface features. Using this data cube, information can be displayed in various forms. Horizontal time slice maps can be made at selected depths. Using a computer workstation, an interpreter can also slice through the data cube to investigate reservoir issues at different seismic horizons. Vertical slices or cross-sections can also be made in any direction using seismic or well data. Seismic picks of reflectors can be contoured, thereby generating a time horizon map. Time horizon maps can be converted to depth to provide a true scale structural interpretation at a specific level.

Seismic data is generally acquired and processed for the purpose of imaging seismic reflections for structural and stratigraphic interpretation. The quality of the seismic data that is ultimately used in the structural and stratigraphic interpretation depends on many different factors and varies from survey to survey. Steps that are omitted or not correctly completed in the data acquisition, data process and data interpretation stages can greatly affect the quality of the final images or numerical representation of the subsurface features. The quality of the seismic data directly affects the reliability of observations and numerical measurements made from the seismic data and affects the decisions that can or should be based on the seismic data.

Constructing accurate seismic images and corresponding earth models is important in making business or operational decisions relating to oil and gas exploration and reservoir management. For example, earth scientists use seismic images to determine where to place wells in subterranean regions containing hydrocarbon reservoirs. They also build models of the subsurface to create reservoir models suitable for reservoir fluid flow modeling. The quality of the business and operational decisions is highly dependent on the quality of the seismic images and earth models.

As described above, determining the quality of the seismic data used in seismic images and earth models is important. Prior art methodologies for determining seismic data quality generate only a single value for data quality for an entire seismic survey. Seismic data quality is not measured and the spatial variability of seismic quality within a particular survey is ignored. Prior art methodologies do not take into account that the quality of the seismic data may vary at differing points in a single seismic survey. Thus, one particular location in a seismic survey may have poor seismic data quality while another location in the same survey may have relatively good seismic data quality. The prior art does not differentiate between locations within a seismic survey based on seismic data quality. Thus, when seismic property estimates are combined with well data, a global correlation coefficient is used, and no account is given to the spatial variability of the quality of the seismic data.

Determining where the high or the low quality seismic data resides within a given seismic survey is important when decisions relating to oil and gas exploration and reservoir management are based in large part on seismic data.

There is a need for a method which determines the seismic data quality for a plurality of locations in a given seismic survey.

SUMMARY OF THE INVENTION

The present invention overcomes the above-described and other shortcomings of the prior art by providing a method of determining seismic data quality for a plurality of locations within a given seismic survey.

One embodiment of the present invention includes a method for measuring seismic data quality which includes acquiring pre-stack seismic data for a seismic survey for an area of interest, and comparing predicted attributes to related attributes associated with the pre-stack seismic data to generate data quality measurements for each of a plurality of locations within the seismic survey. The predicted attributes are geophysically constrained so that they may be accurately forecasted. The method further includes displaying the data quality measurements to a user to illustrate differences in seismic data quality for the plurality of locations within the seismic survey.

It should be appreciated that the data quality measurements generated by the present invention can be utilized in a variety of ways. For example, one embodiment of the present invention additionally includes acquiring well logs related to the area of interest, and computing well-tie measurements for the well logs to the pre-stack seismic data. The data quality measurements are compared with the well-tie measurements to generate a plurality of correlation coefficients used in geostatistical models. One use of the geostatistical models is to determine P90, P50 and P10 values that are associated with the analysis preformed on the seismic data.

Another embodiment of the present invention further includes degrading the well log data and computing well tie measurements for the degraded well log data, and comparing the data quality measurements with the well tie measurements for the degraded well log data to generate a plurality of correlation coefficients to be used in geostatistical models.

It should be appreciated that the predicted geophysical attributes and the geophysical attributes associated with the pre-stack seismic data which are used to determine seismic data quality include seismic amplitude and angle of incidence or seismic amplitude and offset (distance between source and receiver).

It should also be appreciated that by determining the area in which the seismic data quality is low further analysis can be performed to determine the cause(s) of the low seismic data quality. Examples of such causes which are well-known in the art are multiples, residual moveout, anisotropy, random noise and coherent noise.

Oil and gas exploration and reservoir management plans also benefit from the present invention. Plans can be adjusted or based on areas of high seismic data quality. For example, delineation and production wells can be drilled in locations with the best quality seismic data available. The wells will then be drilled with a high degree of certainty that the predicted stratigraphy will be accurate. This can be especially true for the initial wells that are being drilled in areas where there is little or no well log data.

A significant fraction of the value of a well is that it provides hard data on the geology of the subsurface, and in particular, the reservoir in the localized region of the well. If wells are drilled in areas of poor or marginal data quality, there will be poor well-to-seismic ties, i.e. tying well properties to seismic after the well has been drilled. Poor well-to-seismic ties are a severe limitation on the estimation of reservoir properties from seismic data. Well-to-seismic ties are a direct primary input into reservoir property workflows. Poor well-to-seismic ties are significant factors in poor seismic estimation of lateral changes in lithology and/or porosity.

It should also be appreciated that the present invention is intended to be used with a system which includes, in general, an electronic configuration including at least one processor, at least one memory device for storing program code or other data, a video monitor or other display device (i.e., a liquid crystal display) and at least one input device. The processor is preferably a microprocessor or microcontroller-based platform which is capable of displaying images and processing complex mathematical algorithms. The memory device can include random access memory (RAM) for storing event or other data generated or used during a particular process associated with the present invention. The memory device can also include read only memory (ROM) for storing the program code for the controls and processes of the present invention.

Additional features and advantages of the present invention are described in, and will be apparent from, the following Detailed Description of the Invention and the Figures.

BRIEF DESCRIPTION OF THE DRAWINGS

These and other objects, features and advantages of the present invention will become better understood with regard to the following description, pending claims and accompanying drawings where:

FIG. 2 illustrates one embodiment of the present invention utilized in a workflow for reservoir management;

FIG. 3 illustrates one embodiment of the present invention utilized in a workflow for exploration/appraisal;

DETAILED DESCRIPTION OF THE INVENTION

Figure 1:
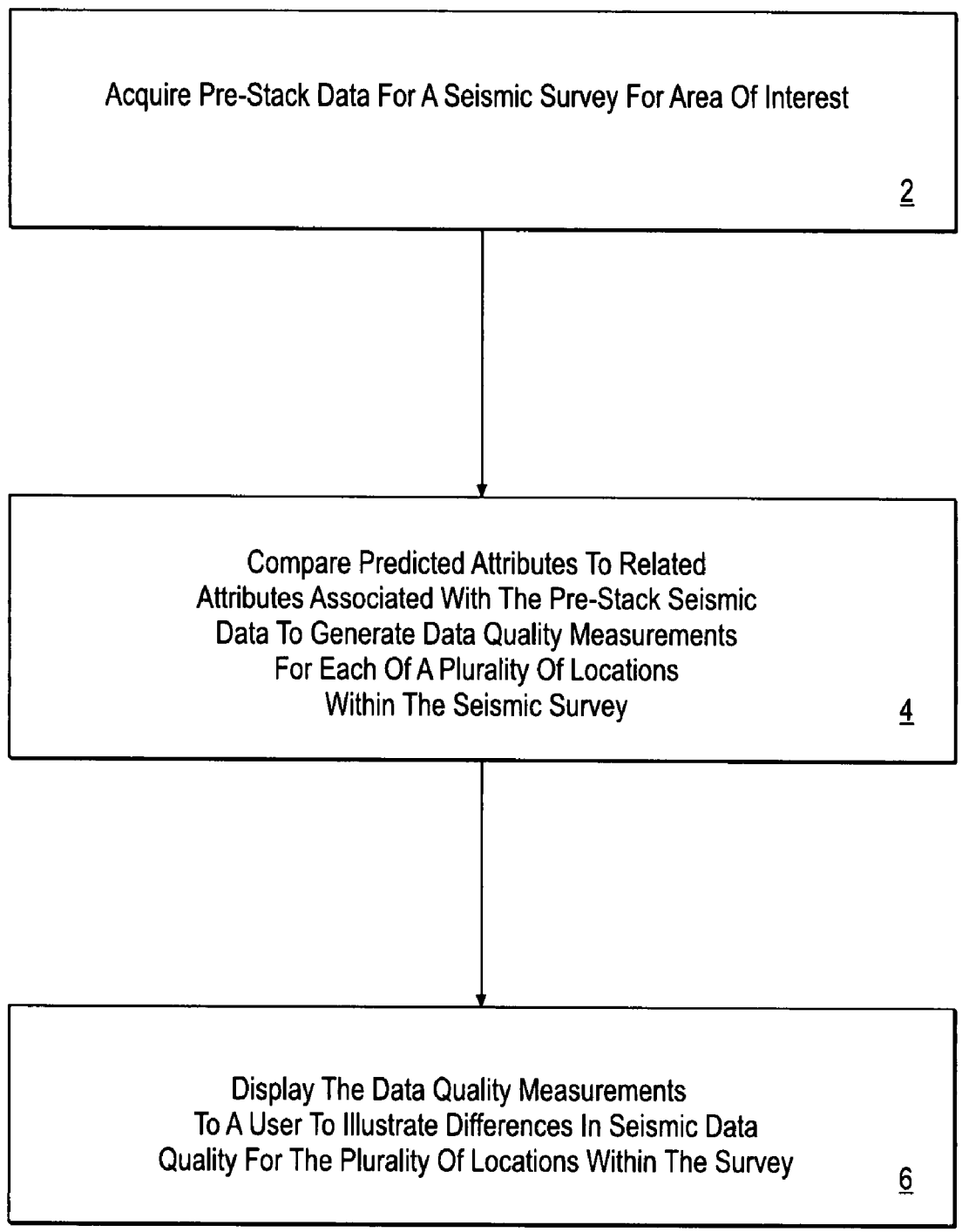
FIG. 1 illustrates a flow chart of one embodiment of the present invention.

While this invention is susceptible to embodiments in many different forms, there are shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

The present invention enables a user to make a novel determination of the differences in the seismic quality of a plurality of locations within a seismic survey. One embodiment of the present invention is illustrated in FIG. 1. That embodiment includes a method for measuring seismic data quality which includes acquiring pre-stack data for a seismic survey for an area of interest 2. The embodiment further includes comparing predicted attributes to related attributes that are associated with the pre-stack data to generate data quality measurements for each of a plurality of locations within the seismic survey 4. In this embodiment the predicted attributes which are used are attributes that are geophysically constrained. With these constraints, accurate predictions as to what the relationships between attributes for a particular subsurface location can be made. The embodiment also includes displaying the data quality measurements to a user to illustrate the differences in seismic data quality for the plurality of locations within the survey 6.

In the above-described embodiment, a scientist and engineer will be able to ascertain areas within a seismic survey with relatively good seismic data quality and relatively poor seismic data quality. The present invention allows seismic data quality differences to be used in the reservoir management and the exploration/appraisal process to evaluate the confidence of the results generated by those processes. For example, FIG. 2 illustrates a workflow in a reservoir management process wherein seismic data 8 undergoes seismic inversion 10 and reservoir properties are estimated, such as porosity, facies and/or lithology 12. The estimated reservoir properties are then used to generate a reservoir model or models 14. The present invention allows seismic data quality 14 in this embodiment to be used during the reservoir model generation to determine the areas with relatively good and poor seismic data quality. With that knowledge, scientists and engineers can have a higher or lower degree of confidence in their observations and measurements depending on a particular location within the model(s) where the decision is being made on and the seismic data quality associated with that location.

FIG. 3 illustrates another embodiment of the present invention which is utilized in the exploration/appraisal process. In this embodiment, seismic attributes 20 are derived from seismic data 18 acquired from a geological region of interest. Examples of seismic attributes 20 include envelope amplitude, instantaneous phase, instantaneous frequency, polarity, velocity, dip, dip azimuth, etc. The seismic attributes 20 are compared to the geophysical attributes which have been determined from forward models of the geological region of interest 24. Utilizing the comparisons of the attributes from the seismic data and attributes from the forward models, final estimates of the attributes are determined and those attributes are used to determine characteristics of the geological region of interest and any reservoirs residing in that region of interest 26. One important characteristic which results from this type of analysis is inferring the fluid type present in the region of interest, i.e. brine, oil, or gas 26.

Prior art methodologies have calculated the overall uncertainty with the result or results of such analyses. This embodiment of the present invention incorporates seismic data quality 22 after the seismic attributes have been determined. In this manner the uncertainties can be more accurately predicted and that uncertainty can be tied to specific locations within the seismic survey.

The present invention allows for inconsistencies and causes of the low quality seismic data to be identified and resolved at earlier stages of the process which saves valuable time and resources.

Figure 4:
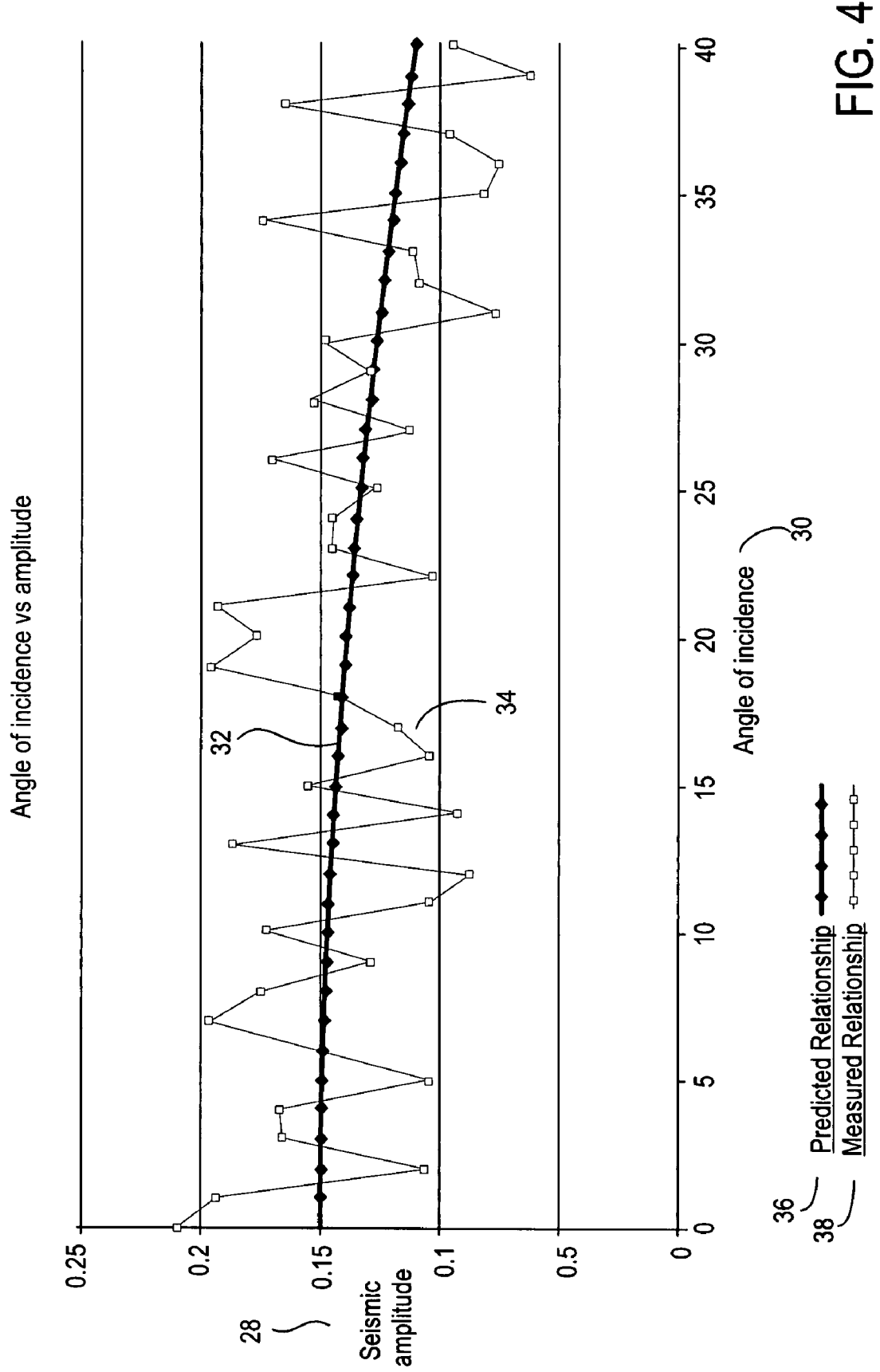
FIG. 4 illustrates a graph of seismic amplitude and angle of incidence which is used by one embodiment of the present invention to determine seismic data quality.

The embodiment illustrated in FIG. 1 includes comparing predicted attributes to related attributes that are associated with the pre-stack seismic data to generate data quality measurements for a plurality of locations within the seismic survey 4. The compared attributes in that embodiment are geophysically constrained so that the attributes can be accurately predicted. FIG. 4 illustrates one embodiment of the present invention which utilizes seismic amplitude 28 versus the angle of incidence 30 to measure the seismic data quality of a particular location in a seismic survey. The relationship 32 between seismic amplitude 28 and angle of incidence 30 is geophysically constrained. As the angle of incidence 30 increases, the seismic amplitude 28 must change in a smoothly varying manner 32. Thus, this embodiment of the present invention utilizes that relationship 32 to determine seismic data quality.

The predicted relationship between the two attributes 32 is compared to the relationship between the attributes obtained from the seismic data 34. The difference between the two relationships 32, 34 is indicative of the seismic data quality being relatively high or low. One means of quantifying this difference is to compute the total length of the line segments comprising the measured data 34 and compare this to the total length of line segments comprising the predicted data 32. Thus, the length of the predicted relationship 32 and the length of the measured relationship 34 of the two attributes can be used to determine a value for seismic data quality. One embodiment of the present invention utilizes the following mathematical expression to generate a seismic data quality value:

$$\text{Quality} = \frac{1}{\left(\frac{\text{Measured}}{\text{Predicted}}\right)^P - 1}$$

wherein:

Quality=Seismic Data Quality;

Measured=Measured Relationship of Attributes (one example is the length of line segments 34 illustrated in FIG. 4);

Predicted=Predicted Relationship of Attributes (one example is the length of line segments 32 illustrated in FIG. 4); and P=Mathematical Exponent.

An alternative embodiment of the present invention utilizes the following mathematical expression to generate a seismic quality value:

$$\text{Quality} = \left(\frac{\text{Predicted}}{\text{Measured}}\right)^P$$

Where Quality, Measured, Predicted and P are defined above. Utilizing the relationship between the attributes that can be measured and predicted, seismic data quality can be determined.

Figure 5:
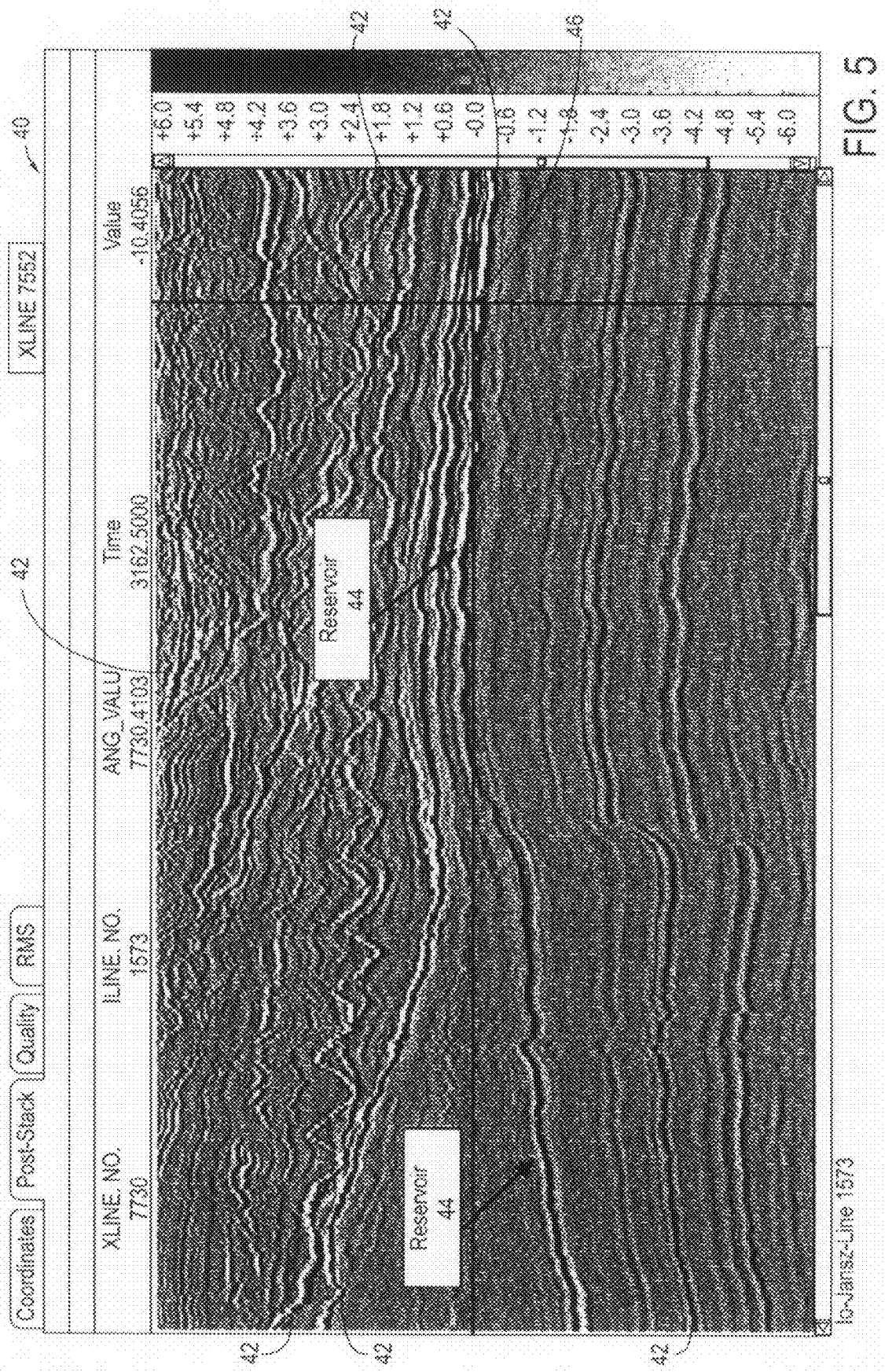
FIG. 5 illustrates an image of a seismic survey.
Figure 6:
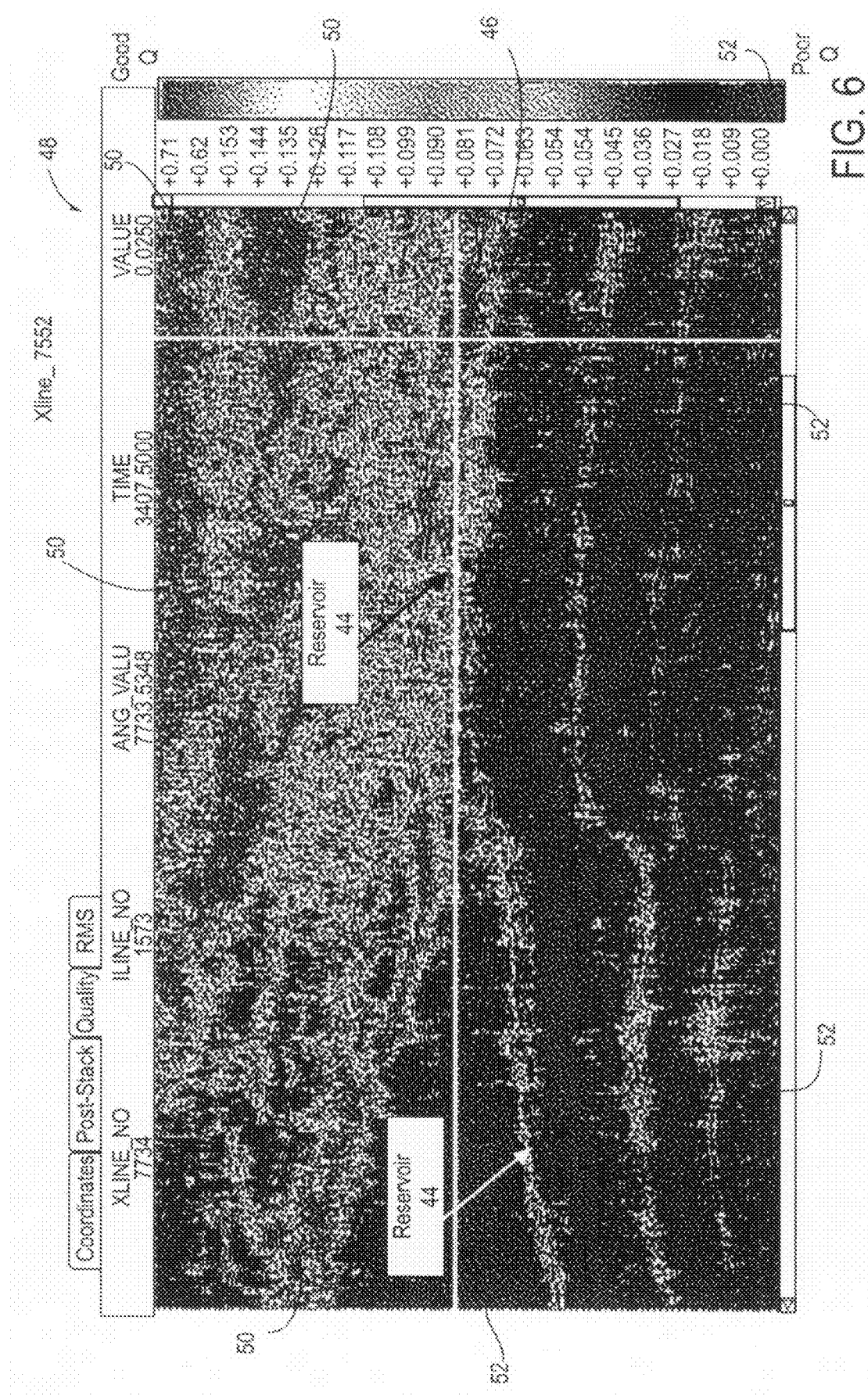
FIG. 6 illustrates the seismic survey shown in FIG. 5 wherein one embodiment of the present invention determined the seismic data quality for a plurality of locations throughout the seismic survey.
Figure 7:
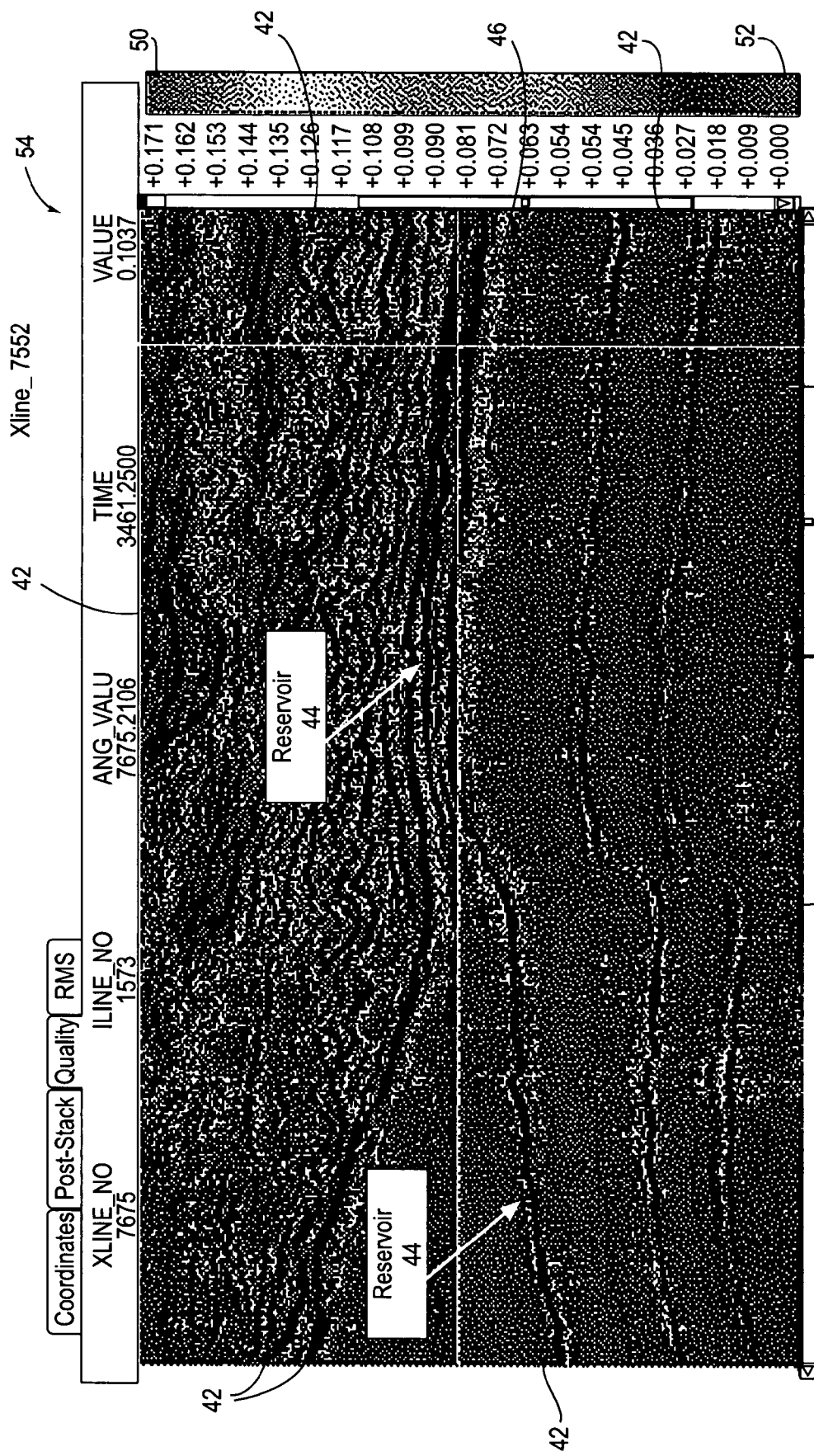
FIG. 7 illustrates the seismic survey shown in FIG. 6 with full angle stacks included in the image.

The present invention determines the seismic data quality for a plurality of locations with a seismic survey. The present invention enables images of seismic data quality to be viewed so that a user can determine areas of high and low seismic data quality within the seismic survey. For example, a cross-sectional post stack image 40 of a seismic survey is illustrated in FIG. 5. The post stack image 40 includes full angle stacks 42, and a reservoir 44 has been identified within this geological region. The present invention enables seismic data quality to be incorporated into the image for further analysis as illustrated in FIG. 6. The areas which have relatively high seismic data quality 52 are distinguished from areas having low seismic data quality 50. FIG. 7 is an image 54 of the same area of geological interest as FIGS. 5 and 6 but the full angle stacks 42 have been included for additional delineation within the image 54.

Figure 8:
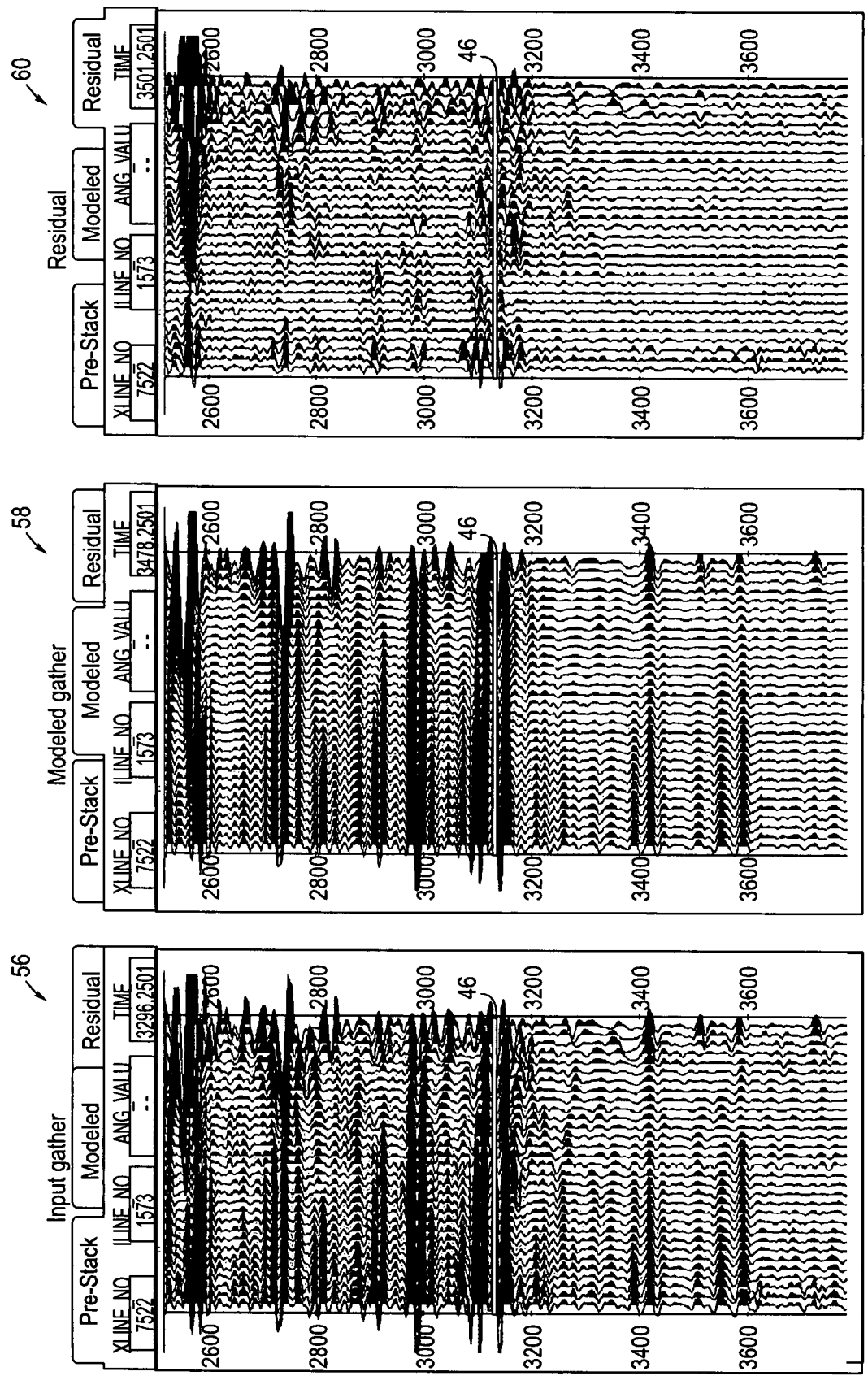
FIG. 8 illustrates an input gather, predicted gather and residual (subtraction of the predicted gather from the input gather) generated by one embodiment of the present invention for a location selected on the seismic survey shown in FIG. 7.

The embodiment of the present invention illustrated in FIGS. 5, 6 and 7 additionally includes the ability to identify a particular location 46 and to analyze the input gather 56 and a modeled (or predicted) gather 58 for that particular location 46. That embodiment is able to compare the input gather 56 with the modeled (or predicted) gather 58 and display a residual 60 as illustrated in FIG. 8. Focusing on the chosen location 46, one can see that there is a relatively high amount of residual 60 which indicates poor seismic data quality.

Figure 9:
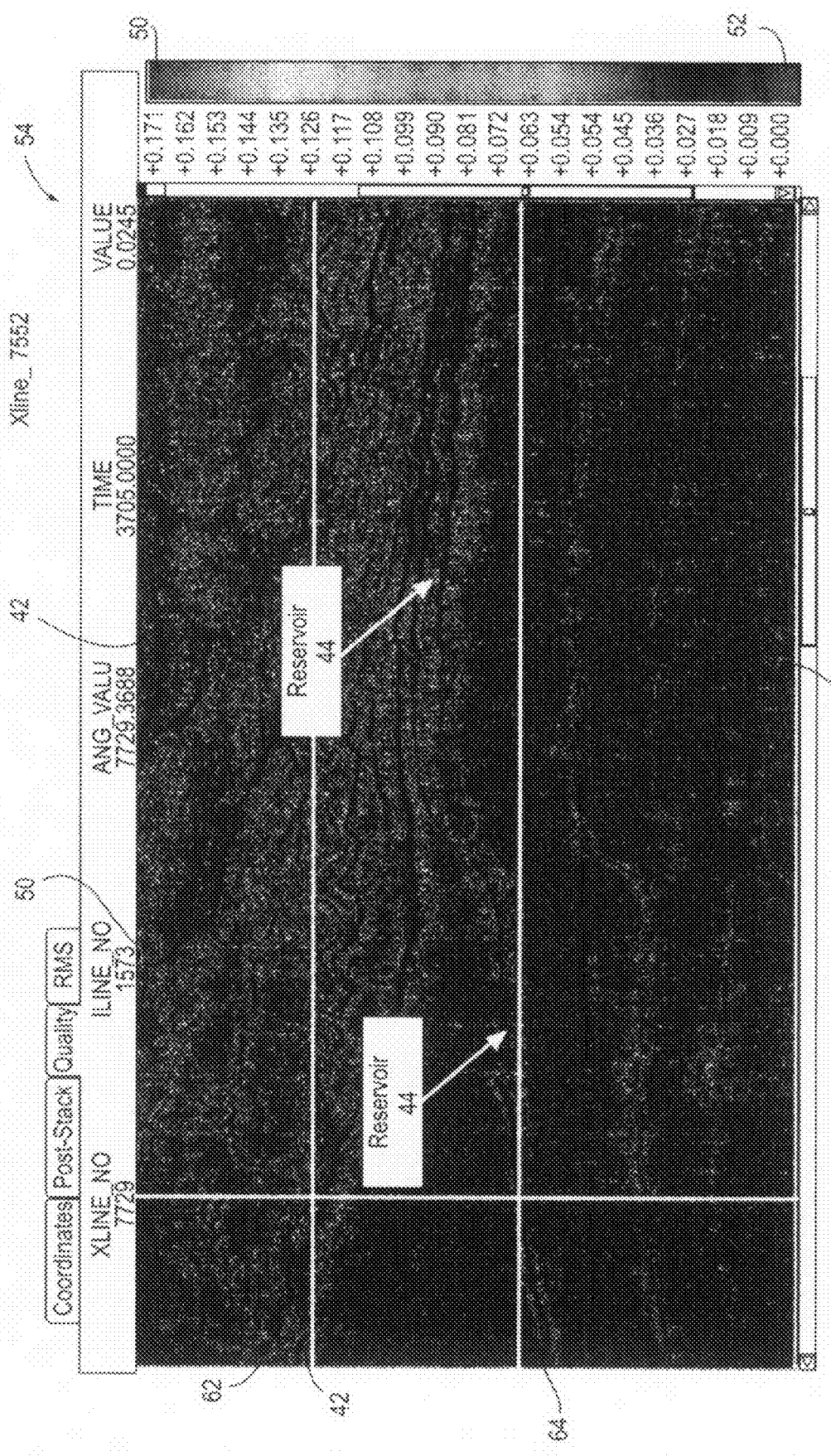
FIG. 9 illustrates the seismic survey shown in FIG. 7 with two selected locations.
Figure 10:
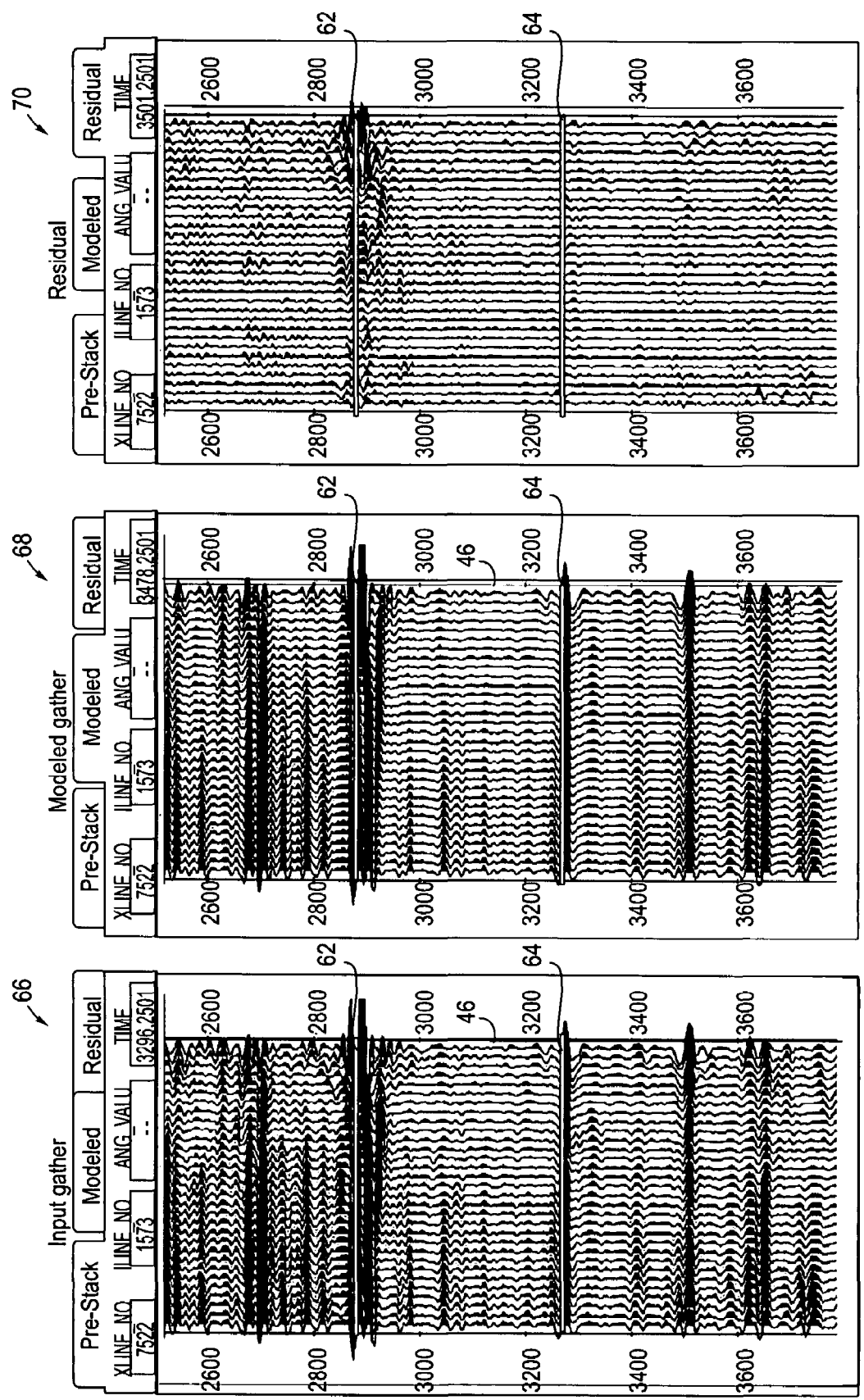
FIG. 10 illustrates an input gather, predicted gather and residual generated by one embodiment of the present invention for the two selected locations included in the seismic survey shown in FIG. 9.

FIG. 9 illustrates the same geological region of interest 54 as FIG. 7, however, two different locations have been chosen. One location is in a region of poor seismic data quality 62, and the other location is chosen in a region of good seismic data quality 64. As the two locations 62, 64 are on the same vertical axis, the locations can be displayed on an input gather 66, modeled gather 68 and residual 70 as illustrated in FIG. 10. Comparing the location with poor seismic data quality 62 and the location with high seismic data quality 64, the location with poor seismic data quality 62 has more residual 70 that the location with high seismic data quality 64.

The present invention allows for a variety of methodologies of determining the seismic data quality for a seismic survey and those methodologies are intended to be within the scope of the present invention. For example, one embodiment of the present invention utilizes an interactive program to allow the selection and viewing of gathers. That embodiment allows the user to select a seismic quality vertical slice from a seismic survey and display the input gather, modeled gather and the residual for that slice. Another embodiment of the present invention processes all or a portion of the data acquired from an entire 3D seismic survey.

The seismic data quality can also be utilized in geostatistical models which are used to calculate P90, P50 and P10 values associated with decisions which are based on the seismic survey. One embodiment of the present invention determines the seismic data quality for a plurality of locations within a seismic survey, and further includes transforming the seismic data quality measurements into correlation coefficients. This numerical transformation is achieved by deriving a mathematical relationship between seismic quality and well-tie correlation coefficient. Well-ties refer to a comparison of actual seismic traces to synthetic seismic traces computed using well log data. The functional relationship between seismic quality and correlation coefficient is found by plotting values of seismic quality and correlation coefficient at well locations. The functional relationship is used to convert the seismic quality measurements into correlation coefficients. Measurements of seismic quality, converted to measurements of correlation coefficient, are used to control how seismic estimates of reservoir properties are combined with well data in the building of reservoir models.

Figure 11:
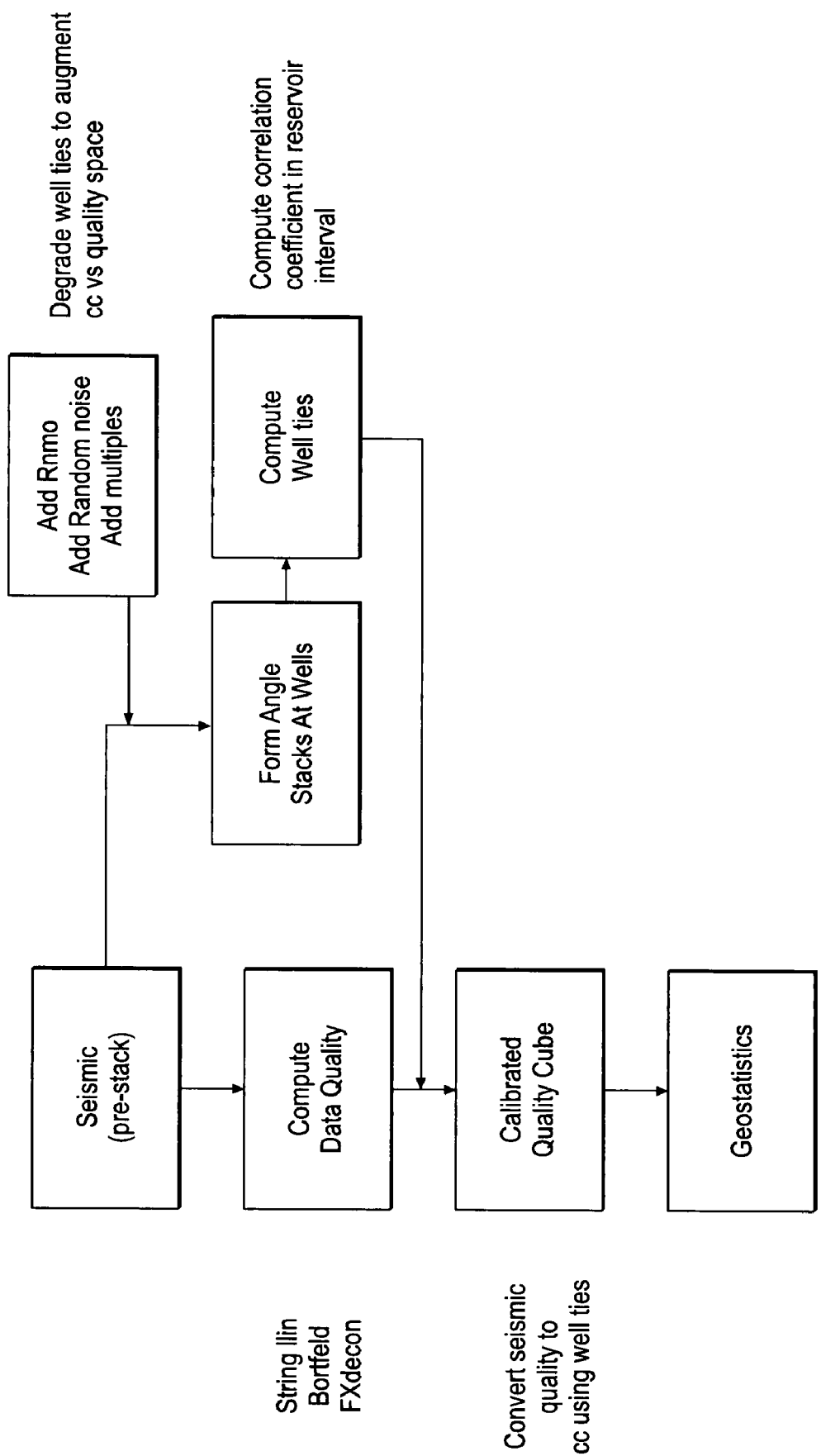
FIG. 11 illustrates a workflow of one embodiment of the present invention wherein the seismic data quality is utilized to perform geostatistical interpolation of well data and reservoir properties estimated from seismic.

One embodiment of the present invention includes acquiring pre-stack seismic data 72, computing the seismic data quality 74 and converting the seismic data quality values to correlation coefficients to generate a calibrated quality cube 76 as illustrated in FIG. 11. The calibrated quality cube 76 is then used in geostatistical interpolation 80. Prior art methods have been limited to generating a single correlation coefficient for an entire seismic survey. The correlation coefficient controls how the seismic estimates of reservoir properties are spatially combined (interpolated) with well data. The present invention enables more detailed and accurate geostatistical determinations by utilizing seismic data quality associated with a particular location within a seismic survey.

Figure 12:
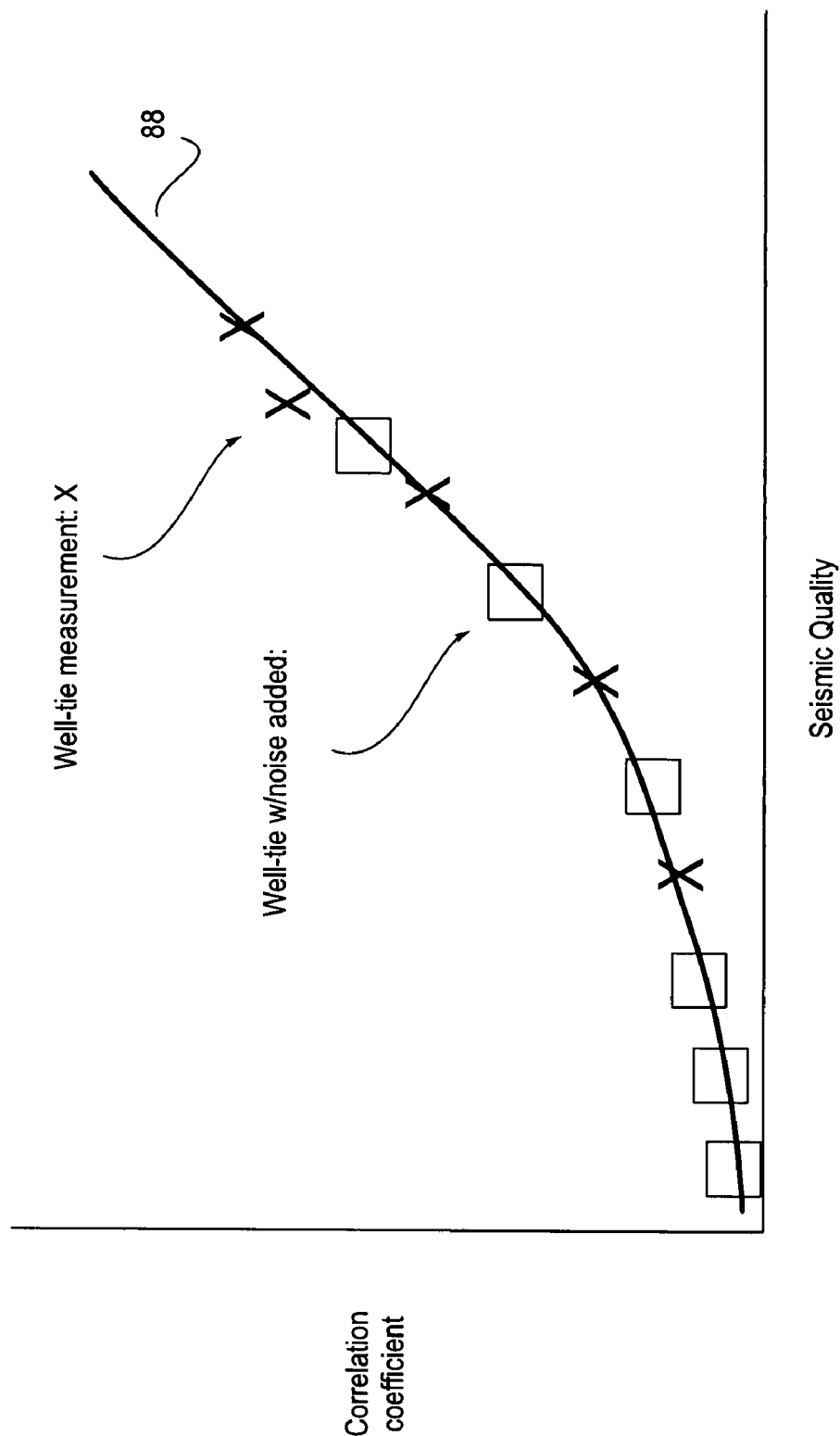
FIG. 12 illustrates a graph which is used by one embodiment of the present invention to determine correlation coefficients.

The embodiment of the present invention illustrated in FIG. 11 uses well-ties to generate correlation coefficients which are then utilized in a geostatistical analysis. This embodiment additionally degrades the seismic data so that additional well-tie measurements can be generated to augment existing well-tie data. Pre-stack seismic data 72 at locations where there is also well data is collected. That pre-stack seismic data 72 is then degraded by adding in residual moveout, random noise and multiples 82 in this embodiment. Angle stacks are formed using the degraded and original pre-stack data obtained from the well locations 84. Well-tie measurements are computed 82, and correlation coefficients for the well-tie measurements are determined. The well-tie measurements are used to establish a relationship 88 between correlation coefficients and seismic data quality as shown in the graph illustrated in FIG. 12. Once the relationship 88 between the correlation coefficients and the seismic data quality has been established, correlation coefficients can be determined for locations that do not have well-tie measurements available. All that is needed for locations where there is no well data is seismic data quality values. With the seismic data quality values, correlation coefficients can be determined regardless of whether well data is available. In this manner, geostatistical interpolation can be performed at multiple locations throughout a seismic survey.

Figure 13:
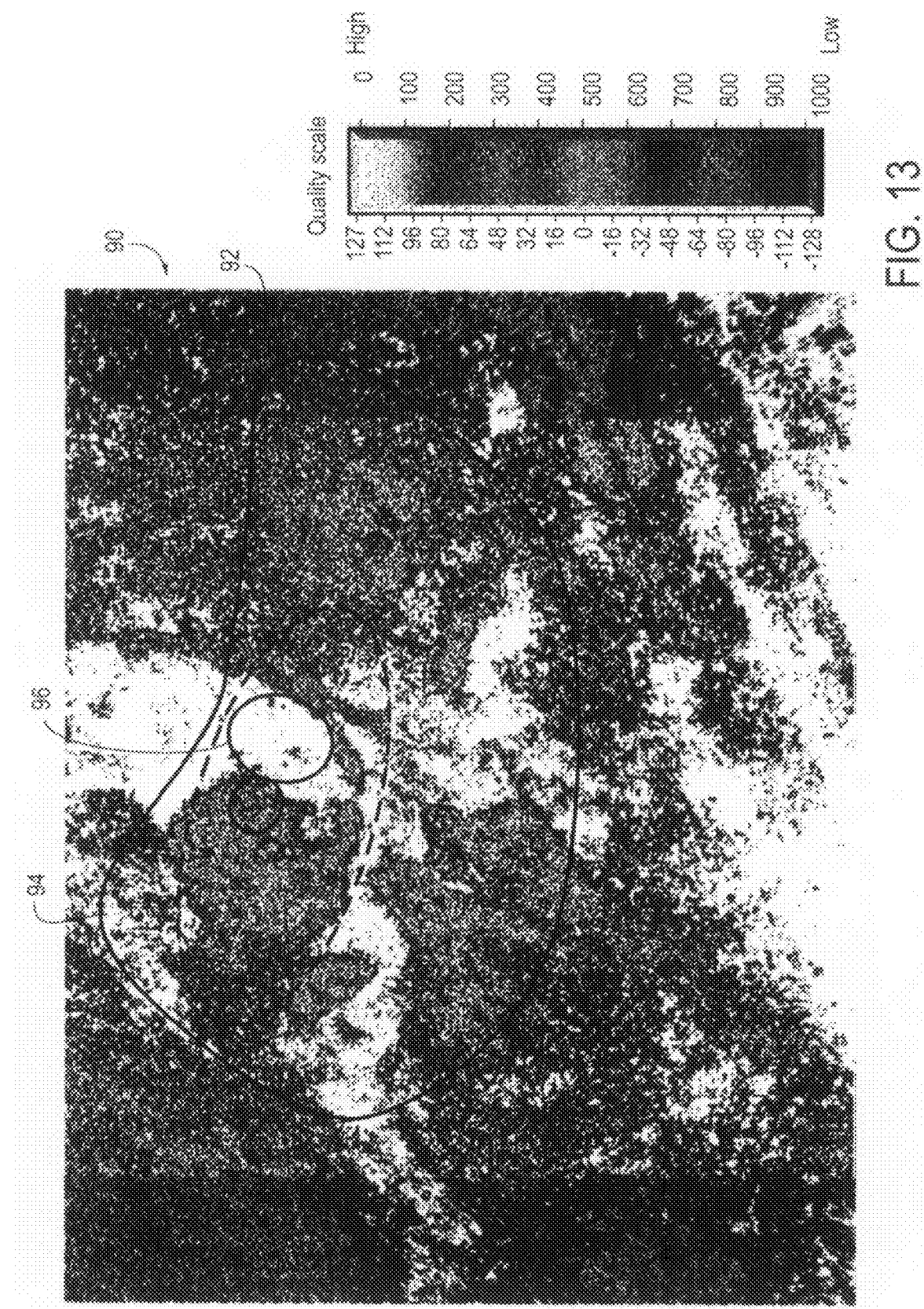
FIG. 13 illustrates a map view of a geological region of interest wherein one embodiment of the present invention has determined the seismic data quality for a plurality of location included on the horizon.

As described-above, the present invention provides valuable information that can be used during reservoir management and exploration/appraisal decision-making. FIG. 13 illustrates a map view 90 of a horizon within a geological region of interest generated by the present invention. Decisions have to be made on where to drill delineation and production wells. In this particular example, it has been determined that a certain area 92 within this region of interest 90 includes a sand layer which potentially bears natural gas. The area 92 is then further narrowed as to the optimal locale 94 for drilling a well. As with most plans, there is spatial flexibility as to the exact location of well placement. Within the locale 94 shown in FIG. 13 there are areas which have good seismic data quality and bad seismic data quality. In this example, the decision can be made to place the well in an area with good seismic data quality 96. Placing the well in the area with good seismic data quality increases the certainty that stratigraphic predictions will be accurate and spatial interpolation of results will be possible.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method of measuring seismic data quality, comprising:
   acquiring pre-stack seismic data for a seismic survey for an area of interest;
   comparing predicted attributes to related attributes associated with the pre-stack seismic data to generate data quality measurements for each of a plurality of locations within the seismic survey, wherein the predicted attributes are geophysically or geologically constrained; and
   displaying the data quality measurements to a user to illustrate differences in seismic data quality for the plurality of locations within the seismic survey, wherein the seismic data quality is a measure of the seismic data reliability.

2. The method of claim 1 which further includes:
   acquiring well logs related to the area of interest, and computing well tie measurements for the well logs to the pre-stack seismic data; and
   comparing the data quality measurements with the well tie measurements to transform the data quality measurements into a plurality of correlation coefficients to be used in building geostatistical models.

3. The method of claim 2 which further includes:
degrading the well log or seismic data and computing well tie measurements for the degraded well log or seismic data; and
comparing the data quality measurements with the well tie measurements for the degraded well log or seismic data to generate a plurality of correlation coefficients to be used in geostatistical models.

4. The method of claim 1 wherein the predicted geophysical attributes and the geophysical attributes associated with the pre-stack seismic data which are compared are seismic amplitude and angle of incidence.

5. The method of claim 1 wherein the predicted geophysical attributes and the geophysical attributes associated with the pre-stack seismic data which are compared seismic amplitude and offset.

6. The method of claim 1 which further includes:
selecting a location from the plurality of locations within the seismic survey;
displaying an input gather for the location and a modeled gather for the location; and
comparing the input gather to the modeled gather to determine a residual, and displaying the residual to the user.

* * * * *